United States Patent
Suenaga et al.

(10) Patent No.: US 12,372,471 B2
(45) Date of Patent: Jul. 29, 2025

(54) RESIN COMPOSITION QUALITY CONTROLLING METHOD, CABLE AND TUBE QUALITY CONTROLLING METHOD, DETERMINATION DEVICE, INSPECTION SYSTEM, CABLE, AND TUBE

(71) Applicant: Hitachi Metals, Ltd., Tokyo (JP)

(72) Inventors: Kazufumi Suenaga, Tokyo (JP); Seiichi Kashimura, Tokyo (JP); Koki Hirano, Tokyo (JP)

(73) Assignee: Proterial, Ltd., Tokyo (JP)

( * ) Notice: Subject to any disclaimer, the term of this patent is extended or adjusted under 35 U.S.C. 154(b) by 438 days.

(21) Appl. No.: 17/896,236

(22) Filed: Aug. 26, 2022

(65) Prior Publication Data
US 2023/0077911 A1 Mar. 16, 2023

(30) Foreign Application Priority Data

Aug. 27, 2021 (JP) ................. 2021-138749
Aug. 25, 2022 (JP) ................. 2022-133976

(51) Int. Cl.
*G01N 21/65* (2006.01)
*C08K 3/22* (2006.01)

(52) U.S. Cl.
CPC ............... *G01N 21/65* (2013.01); *C08K 3/22* (2013.01); *C08K 2003/2241* (2013.01)

(58) Field of Classification Search
CPC .. G01N 21/65; G01N 2021/8405; C08K 3/22; C08K 2003/2241; C08K 2201/014524; C08K 2201/497
See application file for complete search history.

(56) References Cited

U.S. PATENT DOCUMENTS

| | | | |
|---|---|---|---|
| 11,041,091 B2 | 6/2021 | Kashimura et al. | |
| 2009/0078154 A1* | 3/2009 | Sasaki ................ | G02B 27/0006 106/287.19 |
| 2015/0233836 A1* | 8/2015 | Okumura ............. | G01N 21/658 436/501 |
| 2016/0019997 A1* | 1/2016 | Adamchuk ........... | C08L 101/04 524/402 |
| 2021/0079258 A1 | 3/2021 | Kashimura et al. | |
| 2021/0079260 A1 | 3/2021 | Kashimura et al. | |
| 2021/0207000 A1 | 7/2021 | Kashimura et al. | |
| 2021/0238446 A1 | 8/2021 | Kashimura et al. | |
| 2022/0145127 A1 | 5/2022 | Kashimura et al. | |

FOREIGN PATENT DOCUMENTS

CN    105924844 A  *  9/2016 ............. C08L 27/06
JP    6723489 B1      6/2020

* cited by examiner

*Primary Examiner* — Kara E. Geisel
*Assistant Examiner* — Roberto Fabian, Jr.
(74) *Attorney, Agent, or Firm* — Studebaker Brackett PLLC

(57) ABSTRACT

A resin composition quality controlling method includes a step of measuring a Raman spectrum of a resin composition composed of first $TiO_2$ particles of anatase type $TiO_2$ and second $TiO_2$ particles of rutile type $TiO_2$ by irradiation with laser, and determining a concentration ratio of the first $TiO_2$ particles to the second $TiO_2$ particles in the resin composition based on an intensity of a first peak assigned to lattice vibration in the anatase type $TiO_2$ and an intensity of a second peak assigned to lattice vibration in the rutile type $TiO_2$ in the Raman spectrum.

5 Claims, 11 Drawing Sheets

RESIN COMPOSITION QUALITY CONTROLLING METHOD, CABLE AND TUBE QUALITY CONTROLLING METHOD, DETERMINATION DEVICE, INSPECTION SYSTEM, CABLE, AND TUBE

CROSS-REFERENCE TO RELATED APPLICATIONS

The present patent application claims the priority of Japanese patent application No. 2021-138749 filed on Aug. 27, 2021, and the Japanese patent application claiming the domestic priority of Japanese patent application No. 2021-138749 and the entire contents thereof are hereby incorporated by reference.

TECHNICAL FIELD

The present invention relates to a resin composition quality controlling method, a cable and tube quality controlling method, a determination device, an inspection system, and a cable or a tube.

BACKGROUND ART

A cable for a medical device, which includes a sheath comprising a material blended with an infrared absorbing agent such as titanium dioxide ($TiO_2$), has been conventionally known (see Patent Literature 1). According to Patent Literature 1, adding the infrared absorbing agent to the sheath allows a coating film on the sheath to be heated also from the sheath side, and curing of a portion of the coating film on the sheath side to be accelerated at the time of heating the coating film with infrared rays, the adhesion strength between the coating film and the sheath is thereby improved.

CITATION LIST

Patent Literature

Patent Literature 1: Japanese Patent No. 6723489

SUMMARY OF INVENTION

In recent years, sterilization by irradiation with ultraviolet light in the UV-C region (UV-C light), which allows for simple, inexpensive, and reliable sterilization, has attracted attention as a method for sterilizing cables and tubes for medical devices, but to perform sterilization by irradiation with UV-C light, the resistance of cables and tubes to UV-C light becomes a problem. It is known that when deterioration due to irradiation with UV-C light progresses, cracks occur in an insulator at the time of, e.g., bending cables or tubes. For this reason, a resin composition with excellent resistance to not only ultraviolet light included in sunlight and illumination light but also ultraviolet light in a wide wavelength range including the UV-C region is desired to be used as an insulator for a cable and a tube.

Therefore, it is an object of the invention to provide a resin composition quality controlling method for a resin composition including $TiO_2$ added as an ultraviolet light shielding material to provide a resin composition having excellent resistance to UV-C light and resistance to ultraviolet light in a wide wavelength range, a determination device and an inspection system which can be used for the method for controlling the quality of such a resin composition, a cable and tube quality controlling method for a cable or a tube each including, as an insulator, a resin composition including $TiO_2$ added as an ultraviolet light shielding material to provide a cable and a tube each having excellent resistance to UV-C light and resistance to ultraviolet light in a wide wavelength range, and a cable and a tube each of which includes, as an insulator, a resin composition including $TiO_2$ added as an ultraviolet light shielding material and has excellent resistance to UV-C light and resistance to ultraviolet light in a wide wavelength range.

So as to achieve the above object, one aspect of the present invention provides: a resin composition quality controlling method, comprising:
 measuring a Raman spectrum of a resin composition comprising first $TiO_2$ particles comprising anatase type $TiO_2$ and second $TiO_2$ particles comprising rutile type $TiO_2$ by irradiation with laser; and
 determining a concentration ratio of the first $TiO_2$ particles to the second $TiO_2$ particles in the resin composition based on an intensity of a first peak assigned to lattice vibration in the anatase type $TiO_2$ and an intensity of a second peak assigned to lattice vibration in the rutile type $TiO_2$ in the Raman spectrum.

So as to achieve the above object, another aspect of the present invention provides: a cable and tube quality controlling method, comprising:
 determining a concentration ratio in an insulator being provided on a cable or a tube and comprising the resin composition by the resin composition quality controlling method.

So as to achieve the above object, still another aspect of the present invention provides: a determination device configured to perform the determining in the resin composition quality controlling method.

So as to achieve the above object, a further aspect of the present invention provides: an inspection system, comprising:
 a Raman measurement device configured to perform the measuring in the resin composition quality controlling method; and
 a determination device configured to perform the determining in the resin composition quality controlling method.

So as to achieve the above object, a still further aspect of the present invention provides: a cable and a tube each comprising:
 an insulator comprising a resin composition comprising first $TiO_2$ particles comprising anatase type $TiO_2$ and second $TiO_2$ particles comprising rutile type $TiO_2$.

Effects of the Invention

According to the present invention, it is possible to provide a resin composition quality controlling method for a resin composition including $TiO_2$ added as an ultraviolet light shielding material to provide a resin composition having excellent resistance to UV-C light and resistance to ultraviolet light in a wide wavelength range, a determination device and an inspection system which can be used for the method for controlling the quality of such a resin composition, a cable and tube quality controlling method for a cable or a tube each including, as an insulator, a resin composition including $TiO_2$ added as an ultraviolet light shielding material to provide a cable and a tube each having excellent resistance to UV-C light and resistance to ultraviolet light in a wide wavelength range, and a cable and a tube each of which includes, as an insulator, a resin composition includ-

DESCRIPTION OF EMBODIMENTS

First Embodiment (Configuration of Resin Composition)

Figure 1:
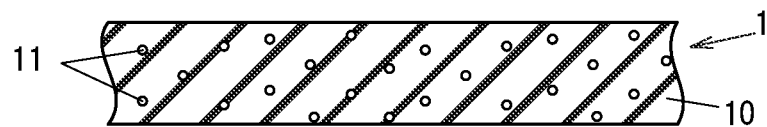
FIG. 1 is a vertical cross-sectional view showing a resin composition according to the first embodiment of the present invention.

FIG. 1 is a vertical cross-sectional view showing a resin composition 1 in the first embodiment of the invention. The resin composition 1 includes a resin 10 as a base material such as silicone rubber, and $TiO_2$ particles 11, which are included in the resin 10.

The $TiO_2$ particles 11 as an ultraviolet light shielding material to shield UV-C light by absorption and/or scattering are added to the resin composition 1. $TiO_2$ has a higher scattering coefficient for ultraviolet light than white pigment ZnO or silicone resin and has an excellent ultraviolet light shielding function. A particle diameter of the $TiO_2$ particles 11 is, e.g., 10 to 500 nm.

The $TiO_2$ particles 11 include $TiO_2$ particles composed of anatase type $TiO_2$ (referred to as first $TiO_2$ particles) and $TiO_2$ particles composed of rutile type $TiO_2$ (referred to as second $TiO_2$ particles). Anatase type $TiO_2$ has a higher absorbance of ultraviolet light in the UV-C region (200 to 280 nm) than rutile type $TiO_2$. Meanwhile, the rutile type $TiO_2$ can absorb longer wavelength ultraviolet light, as compared to anatase type $TiO_2$ (rutile type $TiO_2$ can absorb ultraviolet light at about not more than 400 nm, while anatase type $TiO_2$ can absorb ultraviolet light at about not more than 370 nm).

Thus, since the $TiO_2$ particles 11 include both the first $TiO_2$ particles composed of anatase type $TiO_2$ and the second $TiO_2$ particles composed of rutile type $TiO_2$, the resin composition 1 has excellent resistance to UV-C light and resistance to ultraviolet light in a wide wavelength range. When resistance to UV-C light is particularly important, a proportion of the first $TiO_2$ particles should be increased, that is, a value of a ratio of the mass of the first $TiO_2$ particles to the mass of the second $TiO_2$ particles should be increased. When resistance to long-wavelength ultraviolet light (UV-A, etc.) is particularly important, a proportion of the second $TiO_2$ particles should be increased, that is, a value of a ratio of the mass of the first $TiO_2$ particles to the mass of the second $TiO_2$ particles should be decreased.

As the resin 10, it is possible to use, e.g., silicone rubber, polyethylene, chlorinated polyethylene, chloroprene rubber, polyvinyl chloride (PVC), polyurethane, etc. Of those, silicone rubber and chloroprene rubber are preferable from the viewpoint of chemical resistance and heat resistance. Meanwhile, silicone rubber is preferable from the viewpoint of resistance to ultraviolet light. When the resin composition 1 is used as a cable sheath material, common compounding agents such as various cross-linking agents, cross-linking catalysts, antioxidants, plasticizers, lubricants, fillers, flame retardants, stabilizers, and colorants may be added to the resin 10.

The resin composition 1 can be in a variety of forms depending on its intended use. The resin composition 1 is molded into, e.g., a tube shape when used as an insulator of a cable or a tube, and is molded into a sheet shape when used as a highly UV-resistant sheet for constant temperature house or an ultraviolet shielding sheet (ultraviolet shielding curtain) to shield against ultraviolet light leakage from a sterilization chamber, etc.

(Method for Controlling the Quality of Resin Composition)

In the resin composition quality controlling method in the first embodiment, a concentration ratio of the first $TiO_2$ particles composed of anatase type $TiO_2$ to the second $TiO_2$ particles composed of rutile type $TiO_2$ included in the resin composition 1 can be measured by Raman scattering measurement in a non-destructive, non-contact manner while maintaining the original shape of the resin composition 1. The concentration ratio of the first $TiO_2$ particles to the second $TiO_2$ particles can be expressed by, e.g., a mass fraction of the first $TiO_2$ particles or the second $TiO_2$ particles in the $TiO_2$ particles 11.

The resin composition quality controlling method in the first embodiment includes, e.g., a measurement step of measuring a Raman spectrum of the resin composition 1 by irradiation with laser, and a determination step of determining the concentration ratio of the first $TiO_2$ particles to the second $TiO_2$ particles in the resin composition 1 based on the intensity of a peak assigned to lattice vibration in the anatase type $TiO_2$ (referred to as a first peak) and intensity of a peak assigned to lattice vibration in the rutile type $TiO_2$ (referred to as a second peak) in the measured Raman spectrum. Here, the intensity of the peak in the Raman spectrum in the embodiments means peak height or integral intensity.

The intensity of the first peak in the Raman spectrum varies with the content of the anatase type $TiO_2$ in the resin composition 1, and the intensity of the second peak varies with the content of the rutile type $TiO_2$ in the resin composition 1. Therefore, based on these intensities, it is possible to determine the concentration ratio of the first $TiO_2$ particles to the second $TiO_2$ particles in the resin composition 1.

The first peak assigned to lattice vibration in the anatase type $TiO_2$ is, e.g., a peak exhibiting the highest intensity in a range of not less than 365 $cm^{-1}$ and not more than 425 $cm^{-1}$ (referred to as a peak A1), or a peak exhibiting the highest intensity in a range of not less than 485 $cm^{-1}$ and not more than 545 cm-n (referred to as a peak A2), in the Raman spectrum. Meanwhile, the second peak assigned to lattice vibration in the rutile type $TiO_2$ is a peak exhibiting the highest intensity in a range of not less than 205 $cm^{-1}$ and not more than 265 $cm^{-1}$ (referred to as a peak B1), or a peak exhibiting the highest intensity in a range of not less than 415 $cm^{-1}$ and not more than 475 $cm^{-1}$ (referred to as a peak B2), in the Raman spectrum. In this regard, wavenumbers at which the first peak and the second peak exhibit the highest intensities can shift within the above-mentioned ranges depending on the temperature of the resin composition 1, etc., at the time of measurement. The wavenumber range for the highest intensity of the peak A1 partially overlaps that of the peak B2 as described above, but the two can be distinguished since the peak B2 always appears on the long wavelength side of the peak A1.

Figure 2:
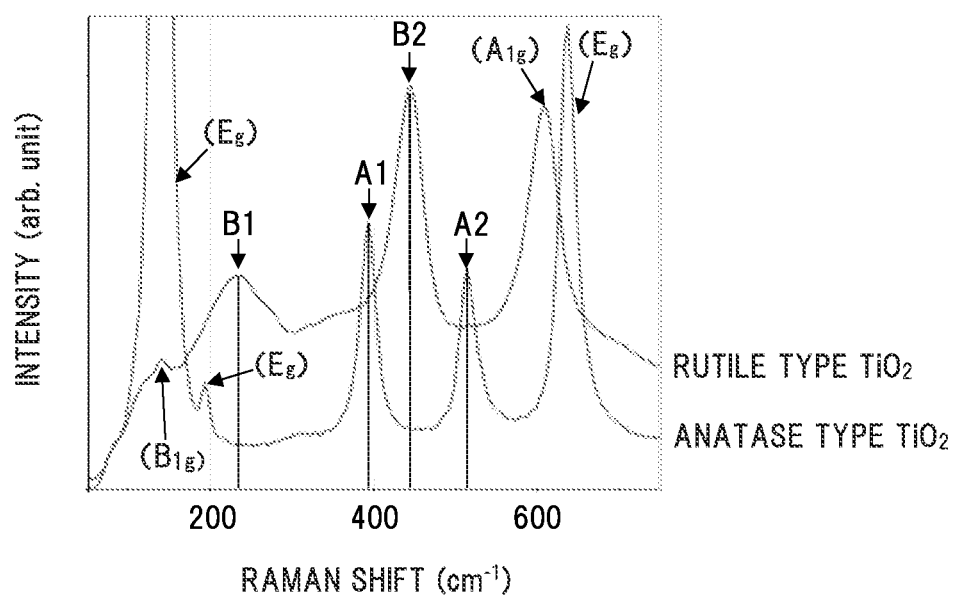
FIG. 2 is a graph showing Raman spectra of anatase type $TiO_2$ and rutile type $TiO_2$.

FIG. 2 is a graph showing Raman spectra of the anatase type $TiO_2$ and the rutile type $TiO_2$. In the Raman spectrum of the anatase type $TiO_2$, the peak A1 exhibiting the highest intensity at about 395 $cm^{-1}$ is a peak resulting from lattice vibration $B_{1g}$ in the anatase type $TiO_2$, and the peak A2 exhibiting the highest intensity at about 515 $cm^{-1}$ is a peak resulting from lattice vibrations $A_{1g}$, $B_{1g}$ in the anatase type $TiO_2$. Meanwhile, the peak B2 exhibiting the highest intensity at about 443 $cm^{-1}$ is a peak resulting from lattice vibration $E_g$ in the rutile type $TiO_2$.

In this regard, Raman spectrum peaks of the anatase type $TiO_2$ other than the peaks A1, A2, or Raman spectrum peaks of the rutile type $TiO_2$ other than the peaks B1, B2 (vibrational modes are indicated in parentheses in FIG. 2) may be used to determine the concentration ratio of the first $TiO_2$ particles to the second $TiO_2$ particles.

By examining in advance a correlation between an intensity ratio of the first peak to the second peak and the concentration ratio of the first $TiO_2$ particles to the second $TiO_2$ particles in the resin composition 1, the concentration ratio of the first $TiO_2$ particles to the second $TiO_2$ particles in the resin composition 1 can be obtained from the intensity ratio of the measured first peak to the measured second peak. In this regard, the concentration ratio of the first $TiO_2$ particles to the second $TiO_2$ particles in the resin composition 1 can be obtained by, e.g., measuring the respective weights of the first $TiO_2$ particles and the second $TiO_2$ particles, or by analysis using X-ray diffraction technique or TEM-EELS method (electron energy-loss spectroscopy) which can identify respective crystal structures of the first $TiO_2$ and the second $TiO_2$, etc. Then, the correlation between the intensity ratio of the first peak to the second peak and the concentration ratio of the first $TiO_2$ particles to the second $TiO_2$ particles in the resin composition 1 can be examined by conducting Raman scattering measurement on the resin composition 1 for which the concentration ratio of the first $TiO_2$ particles to the second $TiO_2$ particles has been measured.

Here, the integral intensities and the peak heights of the first peak and the second peak are computed using a peak profile obtained by fitting analysis using a statistical distribution function such as the Pseudo-Voigt function, Lorentz function, or Gauss distribution function, and are obtained after background correction of the peak profile. The background correction is conducted to eliminate background effects that are not due to the molecular structures of the resin 10 and the $TiO_2$ particles 11 but attributed to unavoidable light such as generated fluorescence, Rayleigh and Mie scattered light originating from irradiation laser light, and disturbing light other than the irradiation laser light, etc., and is performed by subtracting the background profile (baseline), which is obtained by fitting analysis using a polynomial function or a spline function, from the peak profile described above. The integration range in determining the integral intensities of the first peak and the second peak is a range between two intersections of the peak profile described above and the background profile.

In the Raman scattering measurement in the resin composition quality controlling method in the first embodiment, a spot diameter of laser irradiated onto a surface of the resin composition 1 is a measuring area, hence, evaluation can be performed within a microscopic region with a diameter of not more than 1 μm (e.g., 0.4 to 1.0 μm). That is, it is possible to obtain not only average information about the concentration ratio of the first $TiO_2$ particles to the second $TiO_2$ particles in the resin composition 1 but also information for each microscopic region, enabling more precise control of the quality of the resin composition 1. In this regard, the above-mentioned value is not the limit value for the laser spot diameter. In principle, the laser spot diameter is determined by the wavelength of a laser source and the numerical aperture of an objective lens. Therefore, when Raman spectroscopy analysis is performed on the resin composition 1 by using the laser with a shorter wavelength and an objective lens with a large numerical aperture, it is possible to measure in even smaller microscopic regions of less than 0.4 μm.

In addition, in the Raman scattering measurement in the resin composition quality controlling method in the first embodiment, a wavenumber region where the first peak that is assigned to lattice vibration in the anatase type $TiO_2$ and the second peak that is assigned to lattice vibration in the rutile type $TiO_2$ are observed is separated from a wavenumber region where peaks assigned to stretching or bending vibrations characteristic of a resin constituting the resin 10, such as silicone rubber (fingerprint region: about 800 to 1300 $cm^{-1}$), are observed. Therefore, it is possible to obtain the precise concentration ratio of the first $TiO_2$ particles to the second $TiO_2$ particles in the resin composition 1.

In addition, the concentration ratio of the first $TiO_2$ particles to the second $TiO_2$ particles in the resin composition 1 in various forms can be measured by using a gun-type Raman measurement device of which the probe portion including a laser emitting portion and a scattered light receiving portion can be moved freely.

Second Embodiment

The second embodiment of the invention relates to a cable or a tube that includes an insulator composed of the resin composition 1 in the first embodiment. Next, an example of such a cable used for a medical ultrasonic probe cable will be described.

Figure 3:
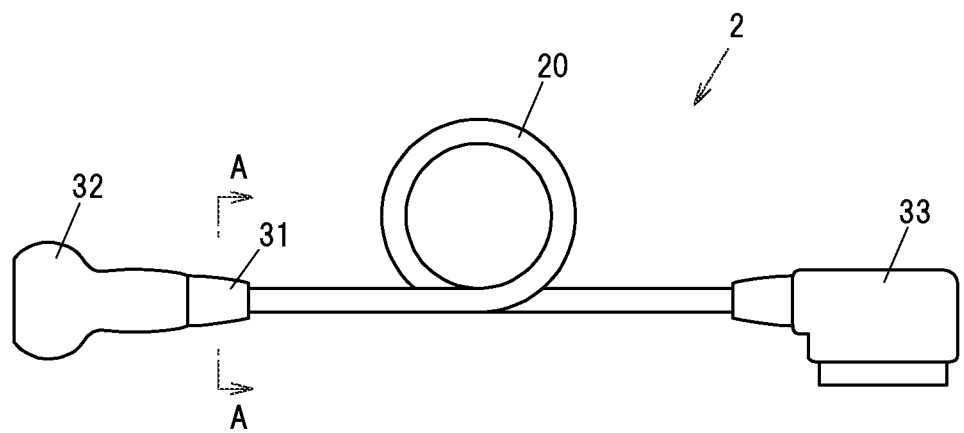
FIG. 3 is a schematic plan view showing a configuration of an ultrasonic probe cable in the second embodiment of the invention.

FIG. 3 is a schematic plan view showing a configuration of an ultrasonic probe cable 2 in the second embodiment of the invention. As shown in FIG. 3, the ultrasonic probe cable 2 is configured such that an ultrasonic probe 32 is attached to an end portion of a cable 20 via a boot 31 protecting the end portion. Then, a connector 33 to be connected to a main body of an ultrasonic imaging device is attached to the other end of the cable 20.

Figure 4A:
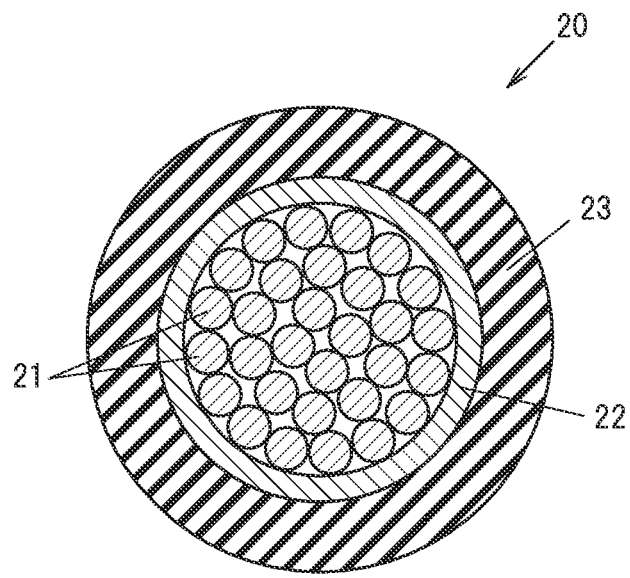
FIG. 4A is a radial cross-sectional view showing a cable of the ultrasonic probe cable.

FIG. 4A is a radial cross-sectional view showing the cable 20 of the ultrasonic probe cable 2. Inside the cable 20, e.g., plural electric wires 21 typified by coaxial cable are housed and a shield 22 such as a braided shield is provided so as to cover the plural electric wires 21. Then, a sheath 23 is provided so as to cover the shield 22.

Figure 4B:
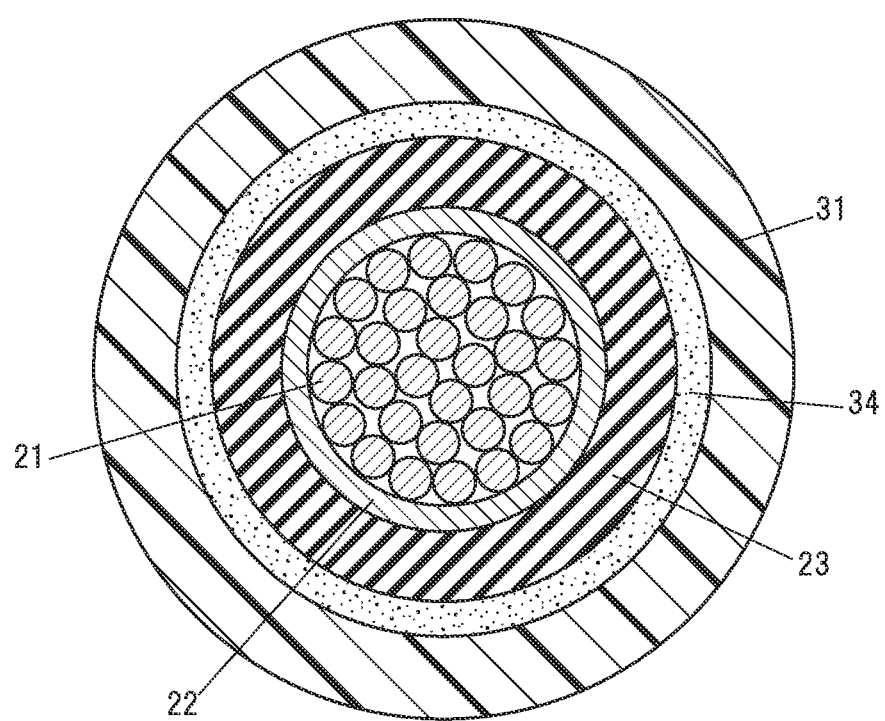
FIG. 4B is a radial cross-sectional view showing the ultrasonic probe cable taken along line A-A shown in FIG. 3.

FIG. 4B is a radial cross-sectional view showing the ultrasonic probe cable 2 taken along line A-A shown in FIG. 3. As shown in FIG. 4B, the boot 31 is attached to the sheath 23 via an adhesive layer 34 so as to cover the sheath 23. The adhesive layer 34 is composed of, e.g., a silicone-based adhesive or an epoxy-based adhesive. Meanwhile, the boot 31 is composed of, e.g., PVC, silicone rubber or chloroprene rubber, etc., and preferably contains $TiO_2$ to shield UV-C light or an organic UV light absorbing agent.

The sheath 23 of the cable 20 is composed of the resin composition 1. That is, the cable 20 includes an insulator (the sheath 23) composed of the resin composition 1 including the first $TiO_2$ particles composed of the anatase type $TiO_2$ and the second $TiO_2$ particles composed of the rutile type $TiO_2$. The $TiO_2$ particles 11 in the sheath 23 are not shown in the drawing.

By using the resin composition 1 having excellent resistance to UV-C light and resistance to ultraviolet light in a wide wavelength range as a material of the sheath 23, it is possible to obtain the cable 20 which has excellent resistance to UV-C light and resistance to ultraviolet light in a wide wavelength range. The cable 20 may additionally have a coating film composed of the resin composition 1 on a surface of the sheath 23. In this case, the concentration ratio of the first $TiO_2$ particles to the second $TiO_2$ particles may be different between the coating film and the sheath 23.

Next, an example of a method for manufacturing the ultrasonic probe cable 2 in the second embodiment will be described. Firstly, plural (e.g., not less than one hundred) electric wires 21 are bundled together. Then, the shield 22 is formed to cover the bundled electric wires 21. Subsequently, the sheath 23 composed of the resin composition 1 is formed to cover the shield 22. The sheath 23 is formed by, e.g., extrusion using an extruder.

Next, a configuration of a tube (a hollow tube) used for medical applications such as a catheter will be described as another example of the cable or tube including an insulator composed of the resin composition 1.

Figure 5:
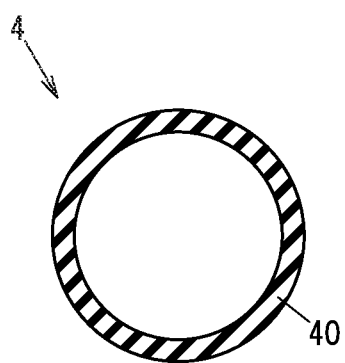
FIG. 5 is a radial cross-sectional view showing a medical tube in the second embodiment of the invention.

FIG. 5 is a radial cross-sectional view showing a medical tube 4 in the second embodiment of the invention. The medical tube 4 includes an insulating tube main body 40 composed of the resin composition 1. That is, the medical tube 4 includes an insulator (the tube main body 40) composed of the resin composition 1 including the first $TiO_2$ particles composed of the anatase type $TiO_2$ and the second $TiO_2$ particles composed of the rutile type $TiO_2$. The $TiO_2$ particles 11 in the tube main body 40 are not shown in the drawing.

By using the resin composition 1 having excellent resistance to UV-C light and resistance to ultraviolet light in a wide wavelength range as a material of the tube main body 40, it is possible to obtain the medical tube 4 which has excellent resistance to UV-C light and resistance to ultraviolet light in a wide wavelength range. The medical tube 4 may additionally have a coating film composed of the resin composition 1 on an inner surface, or an outer surface, or the inner and outer surfaces of the tube main body 40. In this case, the concentration ratio of the first $TiO_2$ particles to the second $TiO_2$ particles may be different between the coating film and the tube main body 40.

(Method for Controlling the Quality of Cable or Tube)

According to the second embodiment, as the cable and tube quality controlling method with an insulator composed of the resin composition 1, it is possible to provide a cable and tube quality controlling method, in which the concentration ratio of the first $TiO_2$ particles to the second $TiO_2$ particles in the insulator is determined using the resin composition quality controlling method described above.

Figure 6A:
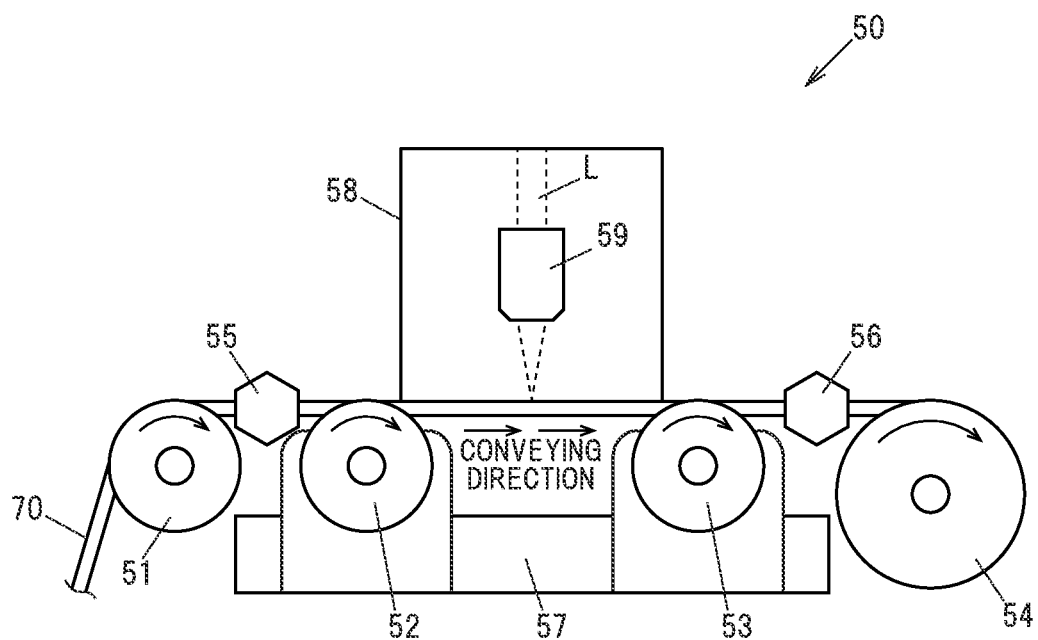
FIGS. 6A and 6B are schematic side and top views showing a configuration example of a cable inspection system used for a method for controlling the quality of a cable.
Figure 6B:
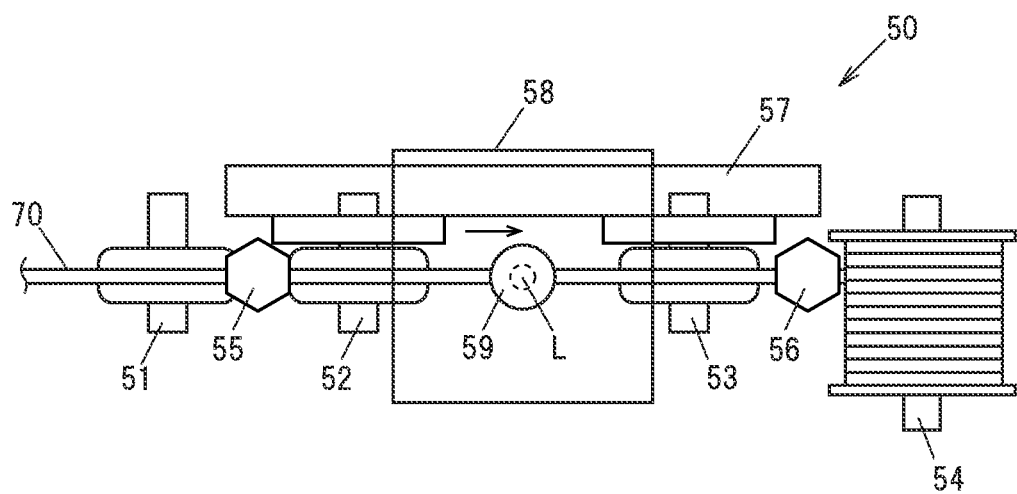

FIGS. 6A and 6B are schematic side and top views showing a configuration example of a cable inspection system 50 used for a method for controlling the quality of a cable. The cable inspection system 50 is configured to inspect a cable 70 including an insulator including the first $TiO_2$ particles and the second $TiO_2$ particles, such as the cable 20 described above and configured to measure the concentration ratio of the first $TiO_2$ particles to the second $TiO_2$ particles in the insulator.

The cable inspection system 50 includes an introduction reel 51 to introduce the cable 70 into the cable inspection system 50, a sending reel 52 to send out the cable 70 introduced by the introduction reel 51 to the measuring area for Raman scattering measurement, a receiving reel 53 to receive the cable 70 which passed through the measuring area, a wind-up coil 54 to wind up the cable 70 received by the receiving reel 53, a sending guide jig 55 placed between the introduction reel 51 and the sending reel 52 to guide advance of the cable 70, a receiving guide jig 56 placed between the receiving reel 53 and the wind-up coil 54 to guide advance of the cable 70, a support 57 to support the sending reel 52 and the receiving reel 53, etc., and a Raman measurement device 58 to perform measurement on the insulator of the cable 70 between the sending reel 52 and the receiving reel 53.

Regarding the Raman measurement device 58, only a probe portion thereof is schematically shown in FIGS. 6A and 6B. The probe portion of the Raman measurement device 58 has an objective lens 59 that focuses laser light L to the insulator of the cable 70.

With the cable inspection system 50, it is possible to measure the concentration ratio of the first $TiO_2$ particles to the second $TiO_2$ particles in the insulator in the original state of the cable 70 without destroying the cable 70.

Figure 7:
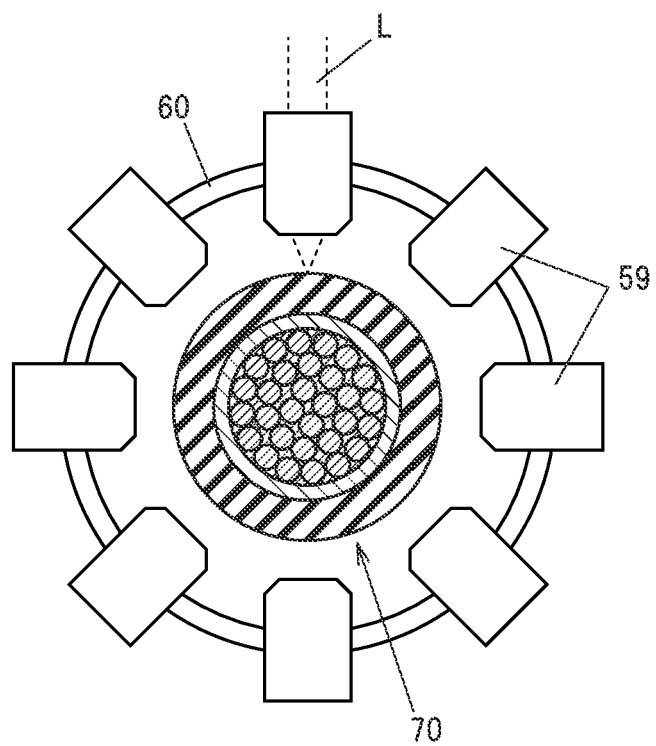
FIG. 7 is a schematic diagram illustrating a probe portion of a Raman measurement device that includes a circumference measuring unit.

The probe portion of the Raman measurement device 58 may include a circumference measuring unit 60 which has plural objective lenses 59 arranged to surround the cable 70, as shown in FIG. 7. Raman scattering measurement can be performed over the entire circumference of the cable 70 by using the circumference measuring unit 60. Alternatively, the circumference measuring unit 60 may have a structure to perform Raman scattering measurement over the entire circumference of the cable 70 by moving one objective lens 59 along the circumferential direction of the cable 70. In addition, the Raman measurement device 58 may be a gun-type Raman measurement device of which the probe portion can be moved freely.

The Raman measurement device 58 may be connected to a determination device that determines the concentration ratio of the first $TiO_2$ particles to the second $TiO_2$ particles in the insulator of the cable 70 based on the intensity of the first peak assigned to lattice vibration in the anatase type $TiO_2$ and intensity of the second peak assigned to lattice vibration in the rutile type $TiO_2$ in the Raman spectrum. This determination device is, e.g., a personal computer with a program to perform the above-mentioned determination stored in storage. This determination device can be also used for quality control of the resin composition 1 in a form other than the insulator of the cable 70. That is, according to the invention, it is possible to provide a determination device configured to perform the above-described determination step in the method for controlling the quality of the resin composition 1.

The Raman measurement device 58 also can perform the measurement step by Raman measurement in the method for controlling the quality of the cable in the second embodiment. The Raman measurement device 58 can be also used for measurement of the resin composition 1 in a form other than the insulator of the cable 70. That is, according to the invention, it is possible to provide an inspection system that includes the Raman measurement device 58 configured to perform the above-described measurement step in the method for controlling the quality of the resin composition 1, and the determination device configured to perform the above-described determination step in the method for controlling the quality of the resin composition 1.

Effects of the Embodiments

According to the first embodiment, to provide a resin composition having excellent resistance to UV-C light and resistance to ultraviolet light in a wide wavelength range, the concentration ratio of the anatase type $TiO_2$ to the rutile type $TiO_2$ in the resin composition 1 can be determined using Raman scattering measurement.

According to the second embodiment, it is possible to provide a cable or a tube that includes an insulator including the first $TiO_2$ particles composed of the anatase type $TiO_2$ and the second $TiO_2$ particles composed of the rutile type $TiO_2$ and has excellent resistance to UV-C light and resistance to ultraviolet light in a wide wavelength range. In addition, according to the second embodiment, to provide a cable or a tube having excellent resistance to UV-C light and resistance to ultraviolet light in a wide wavelength range, the concentration ratio of the anatase type $TiO_2$ to the rutile type $TiO_2$ in the insulator of the cable or the tube can be determined using Raman scattering measurement.

In addition, the resin composition quality controlling method, the cable and tube quality controlling method, and the determination device and the inspection system used in the cable and tube quality controlling method, etc., according to the embodiments described above can be also applied to material development using Materials Informatics (MI) which uses machine learning or artificial intelligence (AI), etc., to analyze data.

EXAMPLE

This Example shows an example of a step of determining the concentration ratio of the first $TiO_2$ particles to the second $TiO_2$ particles in the insulator of the cable based on the intensity of the first peak assigned to lattice vibration in the anatase type $TiO_2$ and the intensity of the second peak assigned to lattice vibration in the rutile type $TiO_2$ in the Raman spectrum.

The resin composition 1 formed using silicone rubber as the resin 10 and shaped into a sheet shape was prepared and Raman scattering measurement was performed. The Raman scattering measurement was performed using RAMANforce Standard VIS-NIR-HS available from Nanophoton Corporation under the following measurement conditions: a wavelength of the laser was 532 nm, a width of an incident slit of a spectrometer was 50 μm, the number of rulings in a diffraction grating was 300 gr/mm, a value of a ratio of the amount of light after attenuation to the maximum amount of laser light of an ND filter (an attenuation ratio) was 250/255, magnification, numerical aperture (NA) and theoretical measurement diameter of an objective lens were respectively 5×, 0.15 and 2.2 μm, and counting time was 1 second×20 cycles. In addition, the Raman scattering measurement was performed in an environment where the temperature was 20° C. (an average value from a 2-point measurement in an analysis laboratory), the humidity was 28 RH % (an average value from a 3-point measurement in the analysis laboratory), and air pressure was normal pressure (so-called atmospheric pressure).

Figure 8A:
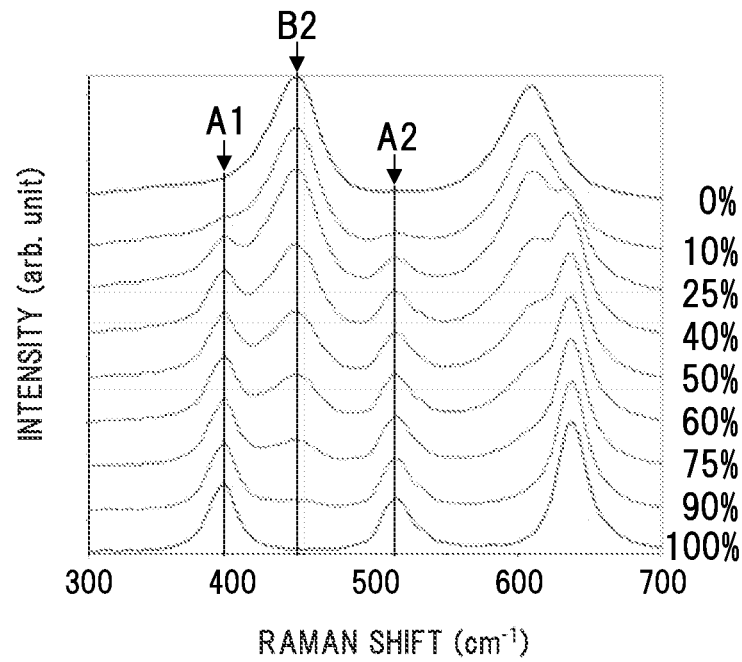
FIGS. 8A and 8B are graphs showing Raman spectra of resin compositions including first $TiO_2$ particles composed of anatase type $TiO_2$ and second $TiO_2$ particles composed of rutile type $TiO_2$.
Figure 8B:
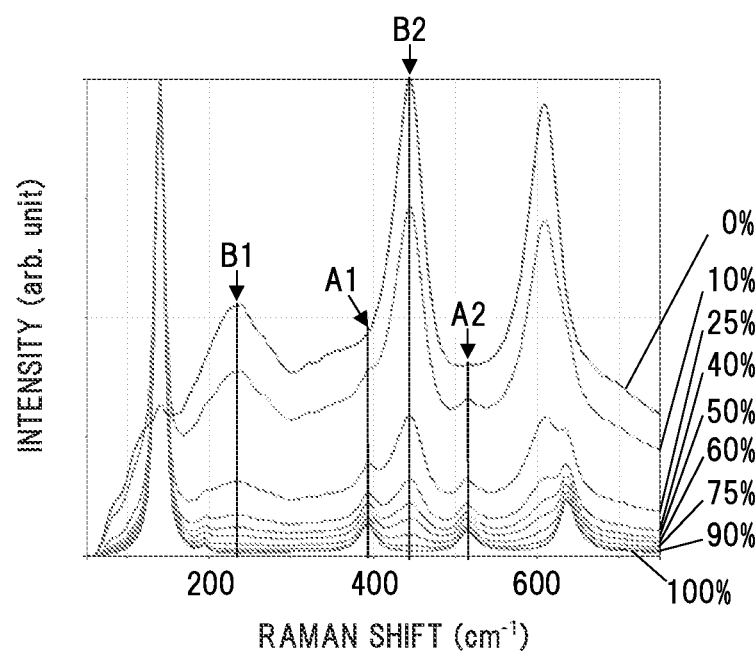

FIGS. 8A and 8B are graphs showing Raman spectra of the resin compositions 1 including the first $TiO_2$ particles composed of the anatase type $TiO_2$ and the second $TiO_2$ particles composed of the rutile type $TiO_2$. FIGS. 8A and 8B show the same Raman spectra. The numerical values on the right side of each Raman spectrum in FIGS. 8A and 8B indicate the mass fraction (%) of the first $TiO_2$ particles in the $TiO_2$ particles 11.

Figure 9A:
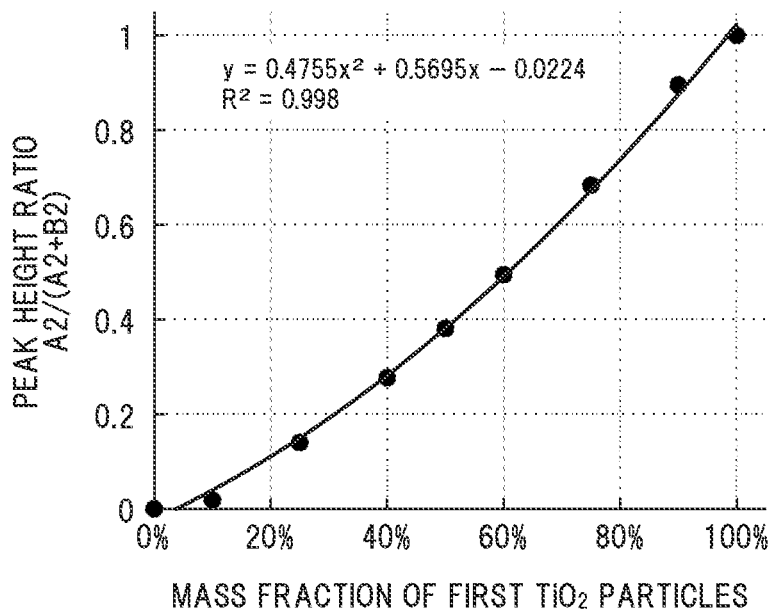
FIG. 9A is a graph showing a relationship between a value of a ratio of a peak height of a peak A2 to a total of the peak height of the peak A2 and a peak height of a peak B2 (a peak height ratio) and a mass fraction of the first $TiO_2$ particles in $TiO_2$ particles 11.
Figure 9B:
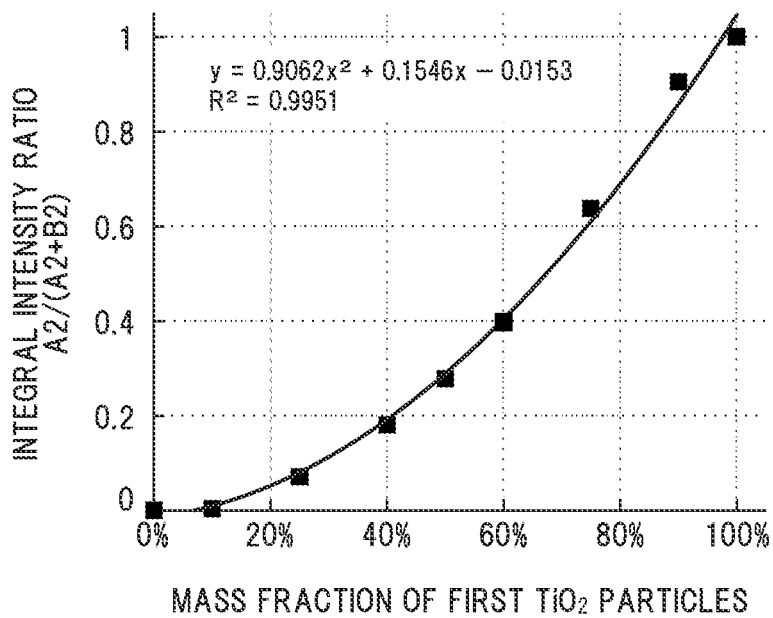
FIG. 9B is a graph showing a relationship between a value of a ratio of the integral intensity of the peak A2 to a total of the integral intensity of the peak A2 and the integral intensity of the peak B2 (an integral intensity ratio) and the mass fraction of the first $TiO_2$ particles in the $TiO_2$ particles 11.

FIG. 9A is a graph showing a relationship between a value of a ratio of the peak height of the peak A2 to the total of the peak height of the peak A2 and the peak height of the peak B2 (a peak height ratio) and the mass fraction of the first $TiO_2$ particles in $TiO_2$ particles 11 obtained by measuring respective weights of the first $TiO_2$ particles and the second $TiO_2$ particles. FIG. 9B is a graph showing a relationship between a value of a ratio of the integral intensity of the peak A2 to the total of the integral intensity of the peak A2 and the integral intensity of the peak B2 (an integral intensity ratio) and the mass fraction of the first $TiO_2$ particles in the $TiO_2$ particles 11 obtained by measuring respective weights of the first $TiO_2$ particles and the second $TiO_2$ particles. The mass fraction (%) of the first $TiO_2$ particles in the $TiO_2$ particles 11 here is expressed by the mass of the first $TiO_2$ particles/(the mass of the first $TiO_2$ particles and the mass of the second $TiO_2$ particles)×100.

Table 1 below shows the peak height ratio and the integral intensity ratio for each mass fraction of the first $TiO_2$ particles in the $TiO_2$ particles 11 for each plotted point in FIGS. 9A and 9B, and the peak height and the integral intensity of each of the peak A2 and the peak B2 for each mass fraction of the first $TiO_2$ particles in the $TiO_2$ particles 11 which were used to calculate the ratios.

TABLE 1

|  |  | Peak A2 | | Peak B2 | | Peak height ratio | Integral intensity ratio |
| --- | --- | --- | --- | --- | --- | --- | --- |
|  |  | Peak height | Integral intensity | Peak height | Integral intensity | | |
| Mass fraction of First $TiO_2$ particles | 0% | 0 | 0 | 23769 | 1644682 | 0 | 0 |
| | 10% | 422 | 2922 | 22205 | 791024 | 0.019 | 0.004 |
| | 25% | 1285 | 7890 | 22503 | 294511 | 0.140 | 0.071 |
| | 40% | 1496 | 32094 | 3907 | 146127 | 0.277 | 0.180 |
| | 50% | 1570 | 36325 | 2554 | 94429 | 0.381 | 0.278 |
| | 60% | 1621 | 39555 | 1659 | 60032 | 0.494 | 0.397 |
| | 75% | 1715 | 47497 | 793 | 27087 | 0.684 | 0.637 |
| | 90% | 1805 | 55974 | 211 | 5873 | 0.896 | 0.905 |
| | 100% | 2009 | 78064 | 0 | 0 | 1 | 1 |

An approximate curve in FIG. 9A is a curve obtained by polynomial approximation using the least-square method and is expressed by the equation $y=0.4755x^2+0.5695x-0.0224$ where x is the mass fraction of the first $TiO_2$ particles in the $TiO_2$ particles 11 and y is the peak height ratio, and its coefficient of determination $R^2$ is 0.998. An approximate curve in FIG. 9B is a curve obtained by polynomial approximation using the least-square method and is expressed by the equation $y=0.9062x^2+0.1546x-0.0153$ where x is the mass fraction of the first $TiO_2$ particles in the $TiO_2$ particles 11 and y is the integral intensity ratio, and its coefficient of determination $R^2$ is 0.9951.

A value of the ratio of the peak height of the peak A2 to the total of the peak height of the peak A2 and the peak height of the peak B2 is read to be 0.381 from the Raman spectra in FIGS. 8A and 8B, hence, it can be determined from the graph in FIG. 9A that the mass fraction of the first particles in the 102 particles 11 obtained by measuring respective weights of the first $TiO_2$ particles and the second $TiO_2$ particles.

Table 2 below shows the peak height ratio and the integral intensity ratio for each mass fraction of the first $TiO_2$ particles in the $TiO_2$ particles 11 for each plotted point in FIGS. 10A and 1B, and the peak height and the integral intensity of each of the peak A2 and the peak B1 for each mass fraction of the first $TiO_2$ particles in the $TiO_2$ particles 11 which were used to calculate the ratios. The values of the peak height and the integral intensity of the peak B1 are not listed since the peak B1 at the mass fraction of the first $TiO_2$ particles of 90% had very low intensity and could not be detected.

TABLE 2

|  |  | Peak A2 | | Peak B1 | | Peak height ratio | Integral intensity ratio |
| --- | --- | --- | --- | --- | --- | --- | --- |
|  |  | Peak height | Integral intensity | Peak height | Integral intensity | | |
| Mass | 0% | 0 | 0 | 9374 | 1398181 | 0 | 0 |
| | 10% | 422 | 2922 | 7593 | 601897 | 0.053 | 0.005 |
| | 25% | 1285 | 7890 | 2931 | 394369 | 0.836 | 0.598 |
| | 40% | 1496 | 32094 | 1225 | 146821 | 0.706 | 0.326 |
| | 50% | 1570 | 36325 | 655 | 74992 | 0.550 | 0.179 |
| | 60% | 1621 | 39555 | 318 | 26593 | 0.305 | 0.054 |
| | 75% | 1715 | 47497 | 67 | 1974 | 0.962 | 0.960 |
| | 90% | 1805 | 55974 | — | — | — | — |
| | 100% | 2009 | 78064 | 0 | 0 | 1 | 1 |

$TiO_2$ particles in the $TiO_2$ particles 11 is 50%. Meanwhile, a value of the ratio of the integral intensity of the peak A2 to the total of the integral intensity of the peak A2 and the integral intensity of the peak B2 is read to be 0.289 from the Raman spectra in FIGS. 8A and 8B, hence, it can be determined from the graph in FIG. 9B that the mass fraction of the first $TiO_2$ particles in the $TiO_2$ particles 11 is 50%.

Figure 10A:
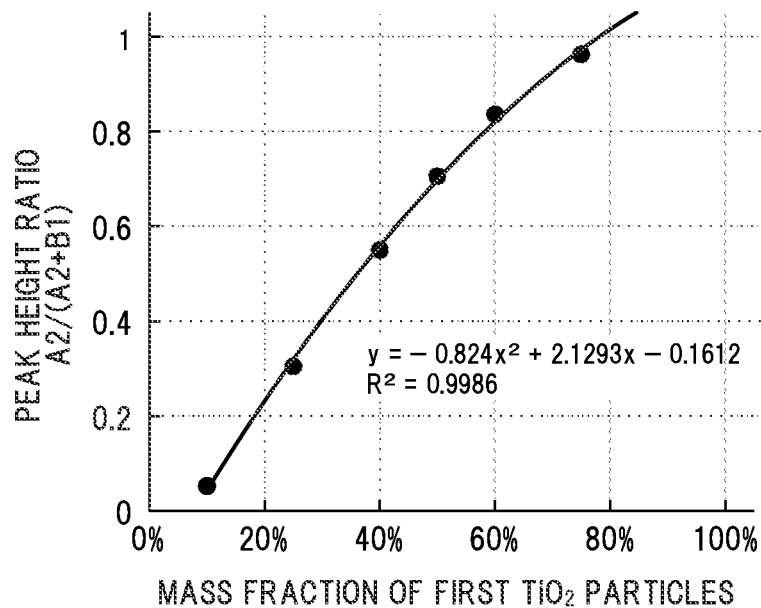
FIG. 10A is a graph showing a relationship between a value of a ratio of the peak height of the peak A2 to a total of the peak height of the peak A2 and a peak height of a peak B1 (a peak height ratio) and the mass fraction of the first $TiO_2$ particles in the $TiO_2$ particles 11.
Figure 10B:
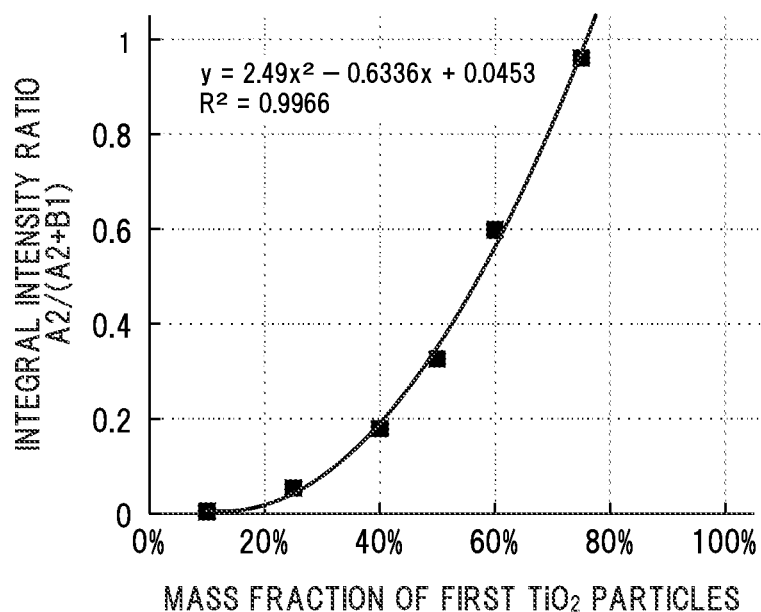
FIG. 10B is a graph showing a relationship between a value of a ratio of the integral intensity of the peak A2 to a total of the integral intensity of the peak A2 and the integral intensity of the peak B1 (an integral intensity ratio) and the mass fraction of the first 102 particles in the $TiO_2$ particles 11.

FIG. 10A is a graph showing a relationship between a value of a ratio of the peak height of the peak A2 to the total of the peak height of the peak A2 and the peak height of the peak B1 (a peak height ratio) and the mass fraction of the first $TiO_2$ particles in $TiO_2$ particles 11 obtained by measuring respective weights of the first $TiO_2$ particles and the second 102 particles. FIG. 10B is a graph showing a relationship between a value of a ratio of the integral intensity of the peak A2 to the total of the integral intensity of the peak A2 and the integral intensity of the peak B1 (an integral intensity ratio) and the mass fraction of the first $TiO_2$ An approximate curve in FIG. 10A is a curve obtained by polynomial approximation using the least-square method and is expressed by the equation $y=-0.824x^2+2.1293x-0.1612$ where x is the mass fraction of the first $TiO_2$ particles in the $TiO_2$ particles 11 and y is the peak height ratio, and its coefficient of determination $R^2$ is 0.9986. An approximate curve in FIG. 10B is a curve obtained by polynomial approximation using the least-square method and is expressed by the equation $y=2.49x^2-0.6336x+0.0453$ where x is the mass fraction of the first 1102 particles in the $TiO_2$ particles 11 and y is the integral intensity ratio, and its coefficient of determination $R^2$ is 0.9966.

A value of the ratio of the peak height of the peak A2 to the total of the peak height of the peak A2 and the peak height of the peak B1 is read to be 0.697 from the Raman spectra in FIGS. 8A and 8B, hence, it can be determined from the graph in FIG. 10A that the mass fraction of the first $TiO_2$ particles in the $TiO_2$ particles 11 is 50%. Meanwhile, a value of the ratio of the integral intensity of the peak A2 to the total of the integral intensity of the peak A2 and the integral intensity of the peak B1 is read to be 0.351 from the Raman spectra in FIGS. 8A and 8B, hence, it can be determined from the graph in FIG. 10B that the mass fraction of the first $TiO_2$ particles in the $TiO_2$ particles 11 is 50%.

Figure 11A:
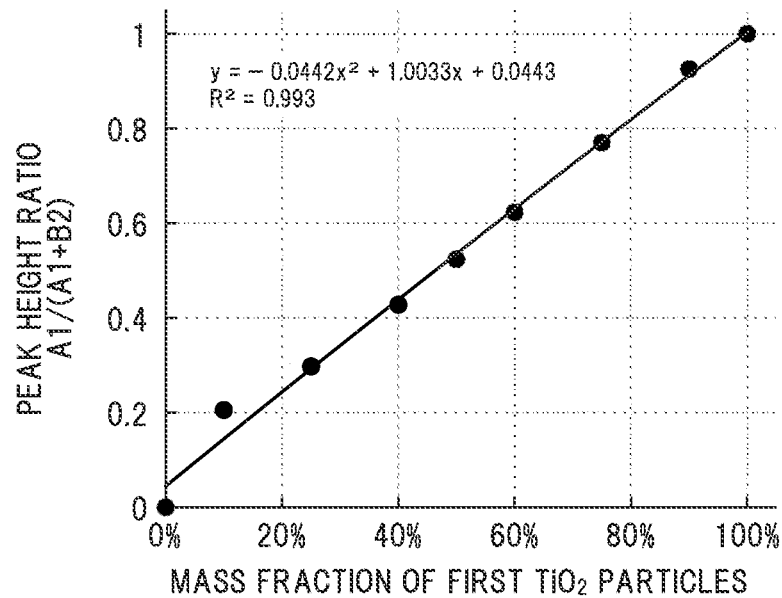
FIG. 11A is a graph showing a relationship between a value of a ratio of a peak height of a peak A1 to a total of the peak height of the peak A1 and the peak height of the peak B2 (a peak height ratio) and the mass fraction of the first $TiO_2$ particles in the $TiO_2$ particles 11.
Figure 11B:
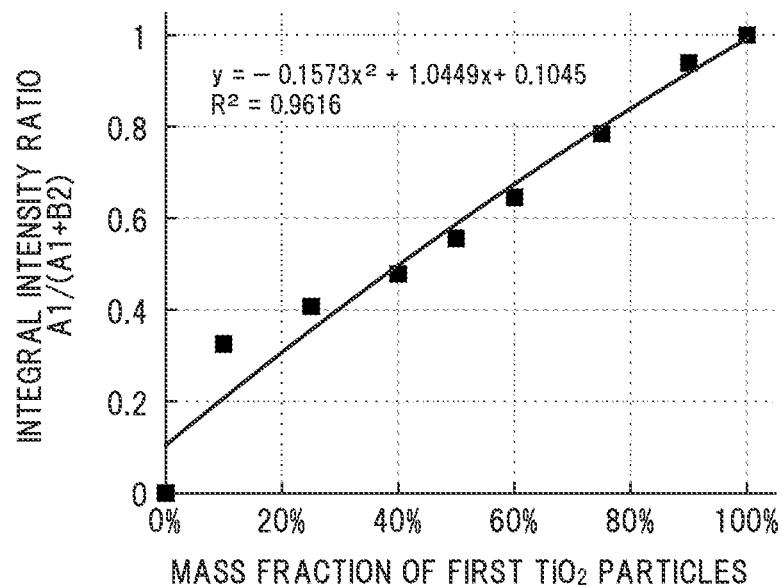
FIG. 11B is a graph showing a relationship between a value of a ratio of the integral intensity of the peak A1 to a total of the integral intensity of the peak A1 and the integral intensity of the peak B2 (an integral intensity ratio) and the mass fraction of the first $TiO_2$ particles in the $TiO_2$ particles 11.

FIG. 11A is a graph showing a relationship between a value of a ratio of the peak height of the peak A1 to the total of the peak height of the peak A1 and the peak height of the peak B2 (a peak height ratio) and the mass fraction of the first $TiO_2$ particles in $TiO_2$ particles 11 obtained by measuring respective weights of the first $TiO_2$ particles and the second $TiO_2$ particles. FIG. 11B is a graph showing a relationship between a value of a ratio of the integral intensity of the peak A1 to the total of the integral intensity of the peak A1 and the integral intensity of the peak B2 (an integral intensity ratio) and the mass fraction of the first $TiO_2$ particles in the $TiO_2$ particles 11 obtained by measuring respective weights of the first $TiO_2$ particles and the second $TiO_2$ particles.

Table 3 below shows the peak height ratio and the integral intensity ratio for each mass fraction of the first 1102 particles in the $TiO_2$ particles 11 for each plotted point in FIGS. 11A and 11B, and the peak height and the integral intensity of each of the peak A1 and the peak B2 for each mass fraction of the first $TiO_2$ particles in the $TiO_2$ particles 11 which were used to calculate the ratios.

TABLE 3

|  |  | Peak A1 | | Peak B2 | | Peak height ratio | Integral intensity ratio |
|---|---|---|---|---|---|---|---|
|  |  | Peak height | Integral intensity | Peak height | Integral intensity | | |
| Mass fraction of First $TiO_2$ particles | 0% | 0 | 0 | 23769 | 1644682 | 0 | 0 |
| | 10% | 5739 | 381582 | 22205 | 791024 | 0.205 | 0.325 |
| | 25% | 3340 | 202606 | 7891 | 294511 | 0.297 | 0.408 |
| | 40% | 2919 | 134064 | 3907 | 146127 | 0.428 | 0.478 |
| | 50% | 2807 | 118323 | 2554 | 94429 | 0.524 | 0.556 |
| | 60% | 2739 | 109321 | 1659 | 60032 | 0.623 | 0.646 |
| | 75% | 2658 | 98738 | 793 | 27087 | 0.770 | 0.785 |
| | 90% | 2601 | 91001 | 211 | 5873 | 0.925 | 0.939 |
| | 100% | 2677 | 96047 | 0 | 0 | 1 | 1 |

An approximate curve in FIG. 11A is a curve obtained by polynomial approximation using the least-square method and is expressed by the equation $y=-0.0442x^2+1.0033x+0.0443$ where x is the mass fraction of the first $TiO_2$ particles in the $TiO_2$ particles 11 and y is the peak height ratio, and its coefficient of determination $R^2$ is 0.993. An approximate curve in FIG. 11B is a curve obtained by polynomial approximation using the least-square method and is expressed by the equation $y=-0.1573x^2+1.0449x+0.1045$ where x is the mass fraction of the first $TiO_2$ particles in the $TiO_2$ particles 11 and y is the integral intensity ratio, and its coefficient of determination $R^2$ is 0.9616.

A value of the ratio of the peak height of the peak A1 to the total of the peak height of the peak A1 and the peak height of the peak B2 is read to be 0.535 from the Raman spectra in FIGS. 8A and 8B, hence, it can be determined from the graph in FIG. 11A that the mass fraction of the first $TiO_2$ particles in the $TiO_2$ particles 11 is 50%. Meanwhile, a value of the ratio of the integral intensity of the peak A1 to the total of the integral intensity of the peak A1 and the integral intensity of the peak B2 is read to be 0.588 from the Raman spectra in FIGS. 8A and 8B, hence, it can be determined from the graph in FIG. 11B that the mass fraction of the first $TiO_2$ particles in the $TiO_2$ particles 11 is 50%.

Raman spectra do not need to be measured over a wide wavenumber range as shown in FIGS. 8A and 8B, and measurement may be performed only in the wavenumber ranges around the first and second peaks which are used to determine the concentration ratio of the first $TiO_2$ particles to the second $TiO_2$ particles.

Summary of the Embodiments

Technical ideas understood from the embodiments will be described below citing the reference signs, etc., used for the embodiments. However, each reference sign, etc., described below is not intended to limit the constituent elements in the claims to the members, etc., specifically described in the embodiments.

According to the feature [1], a resin composition quality controlling method includes: measuring a Raman spectrum of a resin composition 1 composed of first $TiO_2$ particles comprising anatase type $TiO_2$ and second $TiO_2$ particles comprising rutile type $TiO_2$ by irradiation with laser; and determining a concentration ratio of the first $TiO_2$ particles to the second $TiO_2$ particles in the resin composition 1 based on the intensity of a first peak assigned to lattice vibration in the anatase type $TiO_2$ and the intensity of a second peak assigned to lattice vibration in the rutile type $TiO_2$ in the Raman spectrum.

According to the feature [2], in the resin composition quality controlling method defined by the feature [1], the first peak comprises a peak exhibiting the highest intensity in a range of not less than 365 $cm^{-1}$ and not more than 425 $cm^{-1}$ or a peak exhibiting the highest intensity in a range of not less than 485 $cm^{-1}$ and not more than 545 $cm^{-1}$ in the Raman spectrum, and wherein the second peak includes a peak exhibiting the highest intensity in a range of not less than 205 $cm^{-1}$ and not more than 265 $cm^{-1}$ or a peak exhibiting the highest intensity in a range of not less than 415 $cm^{-1}$ and not more than 475 $cm^{-1}$ in the Raman spectrum.

According to the feature [3], in the resin composition quality controlling method defined by the feature [1] or [2], in the determining, a peak height ratio of the first peak to the second peak is obtained from the Raman spectrum, and a concentration ratio of the first $TiO_2$ particles to the second $TiO_2$ particles in the resin composition is determined by referring to a relationship obtained in advance between the peak height ratio and the concentration ratio.

According to the feature [4], in the resin composition quality controlling method defined by the feature [1] or [2], wherein in the determining, an integral intensity ratio of the first peak to the second peak is obtained from the Raman spectrum, and a concentration ratio of the first $TiO_2$ particles to the second $TiO_2$ particles in the resin composition is determined by referring to a relationship obtained in advance between the integral intensity ratio and the concentration ratio.

According to the feature [5], a cable and tube quality controlling method includes: determining the concentration ratio in an insulator being provided on a cable 20 or a tube 4 and including the resin composition 1 by the method for controlling the quality of the resin composition 1 defined by any one of the features [1] to [4].

According to the feature [6], a determination device is configured to perform the determining in the resin composition quality controlling method defined by any one of the features [1] to [4].

According to the feature [7], an inspection system 50 includes: a Raman measurement device 58 configured to perform the measuring in the resin composition quality controlling method defined by any one of the features [1] to [4]; and a determination device configured to perform the determining in the resin composition quality controlling method defined by any one of the features [1] to [4].

According to the feature [8], a cable 20 or a tube 4 includes: an insulator composed of the resin composition 1 including first $TiO_2$ particles composed of anatase type $TiO_2$ and second $TiO_2$ particles composed of rutile type $TiO_2$.

Although the embodiments and Example of the invention have been described, the invention according to claims is not to be limited to the embodiments and Example described above, and the various kinds of modifications can be implemented without departing from the gist of the invention. In addition, the invention according to claims is not to be limited to the above-mentioned embodiments and Example. Further, please note that not all combinations of the features described in the embodiments and Example are necessary to solve the problem of the invention.

The invention claimed is:

1. A resin composition quality controlling method for determining a concentration ratio of anatase type $TiO_2$ particles and rutile type $TiO_2$ particles in a resin composition by using a Raman measurement device that includes a probe portion that emits laser light and a computer for measuring, storing, and comparing Raman spectrum peaks, comprising:

measuring a Raman spectrum of the resin composition comprising first $TiO_2$ particles comprising anatase type $TiO_2$ and second $TiO_2$ particles comprising rutile type $TiO_2$ by irradiation of the resin composition with laser light from the probe portion; and determining a concentration ratio of the first $TiO_2$ particles to the second $TiO_2$ particles in the resin composition by means of the computer of the Raman measurement device based on a comparison of an intensity of a first peak assigned to lattice vibration in the anatase type $TiO_2$ and an intensity of a second peak assigned to lattice vibration in the rutile type $TiO_2$ in the Raman spectrum.

2. The resin composition quality controlling method according to claim 1, wherein the first peak comprises a peak exhibiting a highest intensity in a range of not less than 365 $cm^{-1}$ and not more than 425 $cm^{-1}$ or a peak exhibiting a highest intensity in a range of not less than 485 $cm^{-1}$ and not more than 545 $cm^{-1}$ in the Raman spectrum, and wherein the second peak comprises a peak exhibiting a highest intensity in a range of not less than 205 $cm^{-1}$ and not more than 265 $cm^{-1}$ or a peak exhibiting a highest intensity in a range of not less than 415 $cm^{-1}$ and not more than 475 $cm^{-1}$ in the Raman spectrum.

3. The resin composition quality controlling method according to claim 1, wherein in the determining, a peak height ratio of the first peak to the second peak is obtained from the Raman spectrum, and a concentration ratio of the first $TiO_2$ particles to the second $TiO_2$ particles in the resin composition is determined by referring to a relationship obtained in advance between the peak height ratio and the concentration ratio.

4. The resin composition quality controlling method according to claim 1, wherein in the determining, an integral intensity ratio of the first peak to the second peak is obtained from the Raman spectrum, and a concentration ratio of the first $TiO_2$ particles to the second $TiO_2$ particles in the resin composition is determined by referring to a relationship obtained in advance between the integral intensity ratio and the concentration ratio.

5. A cable and tube quality controlling method, comprising:

determining a concentration ratio in an insulator being provided on a cable or a tube and comprising the resin composition by the resin composition quality controlling method according to claim 1.

* * * * *